United States Patent
Lee et al.

(10) Patent No.: US 6,577,570 B2
(45) Date of Patent: Jun. 10, 2003

(54) METHOD FOR DETERMINING OPTIMUM RECORDING POWER OF OPTICAL DISK

(75) Inventors: Woong Yong Lee, Seoul (KR); Bok Hyun Jo, Anyang (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 09/754,359

(22) Filed: Jan. 5, 2001

(65) Prior Publication Data

US 2001/0007546 A1 Jul. 12, 2001

(30) Foreign Application Priority Data

Jan. 6, 2000 (KR) ............................................ 2000/447

(51) Int. Cl.[7] ................................................ G11B 5/09
(52) U.S. Cl. .................................. 369/47.53; 369/53.27
(58) Field of Search ............................. 369/47.5, 47.51, 369/47.52, 47.53, 53.26, 53.27, 116

(56) References Cited

U.S. PATENT DOCUMENTS 5,898,655 A * 4/1999 Takahashi ................... 369/116
6,404,712 B1 * 6/2002 Lee et al. ................. 369/47.53

* cited by examiner

Primary Examiner—Paul W. Huber
(74) Attorney, Agent, or Firm—Birch, Stewart, Kolasch & Birch, LLP.

(57) ABSTRACT

The present invention relates to a method for determining an optimum recording power of an optical disk. The present invention is capable of improving accuracy of an OPC result by minimizing error between the optimum recording power and reference recording power due to writing method difference and manufacture difference of each manufacturer by dividing a certain region for the test recording into a power scan region for searching the optimum recording power and a compensation region for compensating the rotating elements of the optical disk when data is recorded on the optical disk, determining the optimum recording power reflected influence by the rotating elements of the optical disk, storing it on a memory and using it in the next OPC operation.

9 Claims, 5 Drawing Sheets

METHOD FOR DETERMINING OPTIMUM RECORDING POWER OF OPTICAL DISK

BACKGROUND OF THE INVENTION

1. Field of the Invention

The present invention relates to a method for determining the optimum recording power of an apparatus for recording and reproducing data onto an optical disk and, in particular, to a method for determining the optimum recording power of an optical disk which is capable of recording data accurately on an optical disk by using the optimum recording power reflecting influence by rotating elements of the optical disk.

2. Description of the Prior Art

In the conventional optical disk spec Orange book part II, an OPC (Optimum Power Control) region as a test recording region for inspecting an optimum recording power is defined as a PCA (Power Calibration Area) region and is placed on an inner side of a read region of the optical disk.

FIG. 1 is a flow chart illustrating a method for determining the recording power of an optical recording reproducing apparatus in accordance with the conventional technology, as described in detail with reference to FIG. 2.

FIG. 2 illustrates variations in the recording power of each ATIP (Absolute Time In Pre-groove) of FIG. 1.

First, a position for performing the OPC is determined by inspecting a counter region of the PCA of the optical disk, and is moved into a test recording region inside of the PCA in step S10.

Second, an indicative optimum recording power P_ind recorded on each optical disk by the manufacturer is read in step S11. The reference recording power P_ref and power variation P_s are determined using the read value in step S12.

When the optical disk is reproduced as 1-times speed, the indicative optimum recording power P_ind recorded on the disk is used in step S11. When the optical disk is reproduced as N-times speed, the reference recording power is determined by using Equation 1 as shown below.

[Equation 1]

$$P\_ref, N = P\_ind \times [1 + 0.4 \times (N-1)]$$

$$P\_s = 0.043 \times P\_ref$$

The P_ref is the reference recording power, P_ind is the indicative optimum recording power, and P_s is the power variation step.

In addition, the real test recording is performed on a region in the OPC. As depicted in FIG. 2, the optimum recording power used in the test recording is increased gradually by power variation steps (P_s) from a determined reference recording power (P_ref) of −7 to a reference recording power (P_ref) of +7 in step S12. There are power variation steps (P_s) at each ATIP (Absolute time In Pre-groove), with the total number of ATIPs being 15.

A B-level is measured by sampling a certain region of a WRF (Write Radio Frequency) reflected from a pit formed on the optical disk by each laser recording pulse for the 15 ATIP in the test recording in step S13.

The B-level means a level of the WRF signal reflected from the pit formed by laser irradiation in the data recording on the optical disk.

The B-level measured in the test recording is used on a running OPC. In other words, the recording power required for the optimum recording can be varied in accordance with the surrounding temperature and the position of the disk in the real recording.

Accordingly, when recording with the determined reference level, the recording power is controlled so as to be an optimum recording power by maintaining the measured B-level uniformly in the running OPC operation.

In addition, a beta level is measured while reproducing the region recorded with each different optimum recording power in step S14. The recording power in the region, coinciding with a target beta among the measured beta levels, is determined as the optimum recording power. In addition, the B-level corresponding to the recording power is set as the reference B-level for performing the running OPC in the real recording in step S15.

Next, in order to indicate the region where the OPC is performed, is used by the reference B-level, and set optimum recording power, data is recorded on a PCA counter region with the determined optimum recording power in step S16.

As described above, in the conventional technology, the influence of the rotating elements of the disk cannot be responded to, because the beta value and B-level are varied in accordance with the rotating elements of the disk, although the recording is performed on the optical disk with the same recording power.

In addition, in the conventional technology, because the influence of the rotating elements of the optical disk be responded to, the accuracy in determining the recording power is decreased.

In addition, in the conventional technology, although the recording power is determined accurately, the reference level is wrongfully set by the varied beta value and B-level. Accordingly, the accuracy of the recording power is decreased, and it decreases the recording quality.

In addition, in the conventional technology, the character of the optical disk is differs according to the manufacturer, a plurality of errors between the real recording power and reference recording power occur due to differences in the writing method and manufacture deviation etc. of each manufacturer of the optical record reproducing apparatus for recording data on the optical disk.

In addition, in the conventional technology, when the OPC is performed in wide area in order to compensate for a plurality of errors that occur between the real optimum recording power and reference recording power, resolution of the power recording in the OPC decreases. Accordingly, the accuracy of the OPC result decreases.

SUMMARY OF THE INVENTION

It is an object of the present invention to provide a method for determining an optimum recording power of an optical disk which is capable of determining the optimum recording power by being responsive to an influence due to rotating elements of the optical disk.

Another object of the present invention is to provide a method for determining the optimum recording power of an optical disk which is capable of being responsive to an influence due to rotating elements of the optical disk by compensating for a beta value according to the rotating elements of the optical disk and varied value of a B-level.

Yet another object of the present invention is to provide a method for determining the optimum recording power of an optical disk which is capable of taking into consideration a former OPC operation result and the rotating elements of the optical disk in order to determine the optimum recording power when data is recorded on the optical disk.

Still another object of the present invention is to provide a method for determining the optimum recording power of an optical disk which is capable of reducing a plurality of errors between the optimum recording power and the reference recording power due to a difference in a writing method and manufacture between manufacturers of optical record reproducing apparatus for recording data on the optical disk.

Yet another object of the present invention is to provide a method for determining the optimum recording power of an optical disk which is capable of improving resolution of the recording power for recording in a next OPC by storing the optimum recording power determined after the OPC operation and using the stored optimum recording power when the next OPC is performed.

A still further object of the present invention is to provide a method for determining the optimum recording power of the optical disk which is capable of finding the optimum recording power by improving the resolution of the recording power for recording in the OPC.

In a disk having a test recording region in a certain area in order to set the optimum recording power, the method for determining the optimum recording power of an optical disk in accordance with the present invention comprises test-recording on one portion of a test recording region while varying the reference recording power, test-recording on another test-recording region using the reference recording power, and determining the optimum recording power from each test recording result.

The method for determining the optimum recording power of an optical disk comprises a process for judging whether a stored reference recording power is appropriate to a reference recording power, a process for determining the optimum recording power from a compensated beta value after compensating for B-level and beta value by using the reference recording power, and a process for storing the determined optimum recording power on a memory.

The method for determining the optimum recording power of the optical disk comprises a process for judging whether the former recording power stored in memory in accordance with a maker code and recording times speed is appropriate to the reference recording power, a process for setting the stored recording power as the reference recording power when the stored recording power is appropriate or setting default recording power as the reference recording power when the stored recording power is not appropriate, a process for measuring and compensating for a B-level and a beta value by test-recording on the disk with the reference recording power, a process for judging whether the determined optimum recording power exists in the recording power region performed the test recording after determining the optimum recording power and reference B-level from the compensated beta value and B-level, a repetition-performing process for performing repeatedly the B-level and beta value compensation operation by setting the determined optimum recording power as the reference recording power by moving into the next OPC test region when the determined optimum recording power does not exist in the recording power region performed the test recording, and a recording process for storing the determined optimum recording power on a memory and recording on a PCA counter region with the determined optimum recording power when the determined optimum recording power exists in the recording power region performed the test recording.

DETAILED DESCRIPTION OF THE PREFERRED EMBODIMENTS

Figure 1:
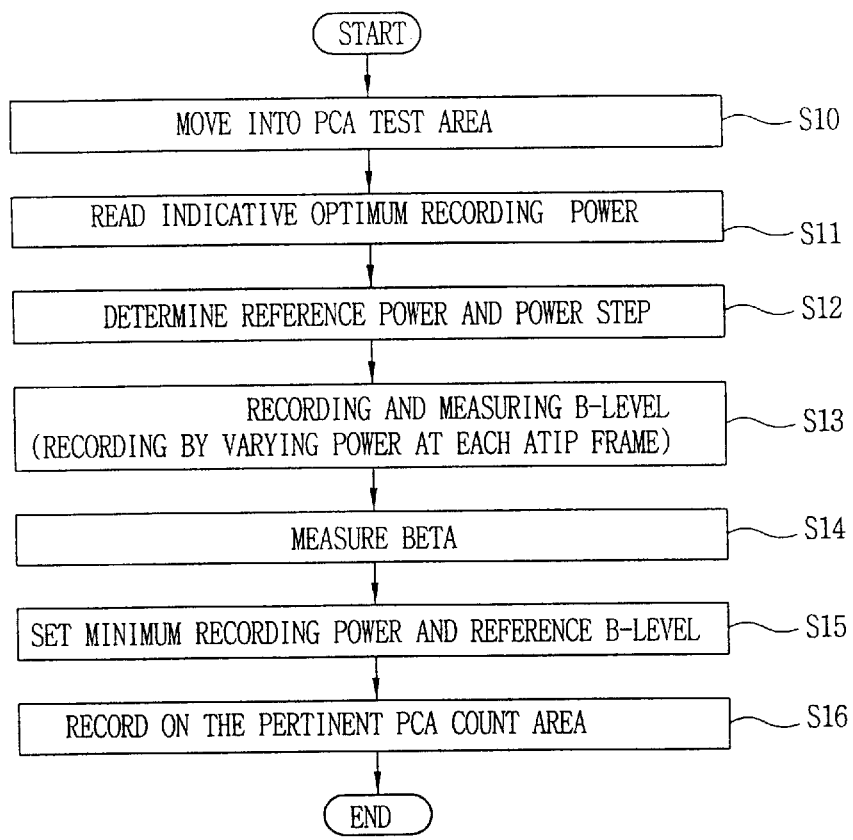
FIG. 1 is a flow chart illustrating a method for determining a recording power of an optical recording reproducing apparatus in accordance with conventional technology.
Figure 2:
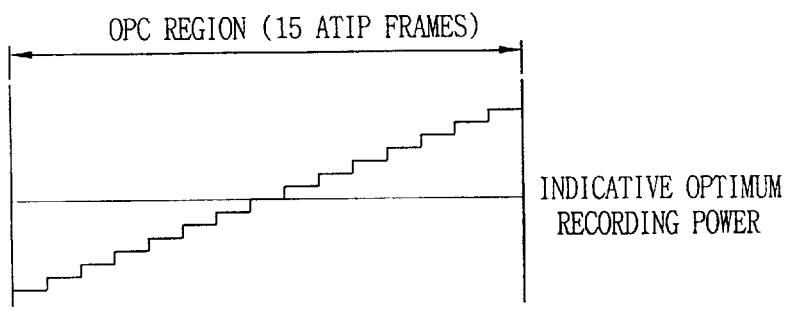
FIG. 2 illustrates variations in the recording power of each ATIP (Absolute Time In Pre-groove) of FIG. 1.
Figure 3:
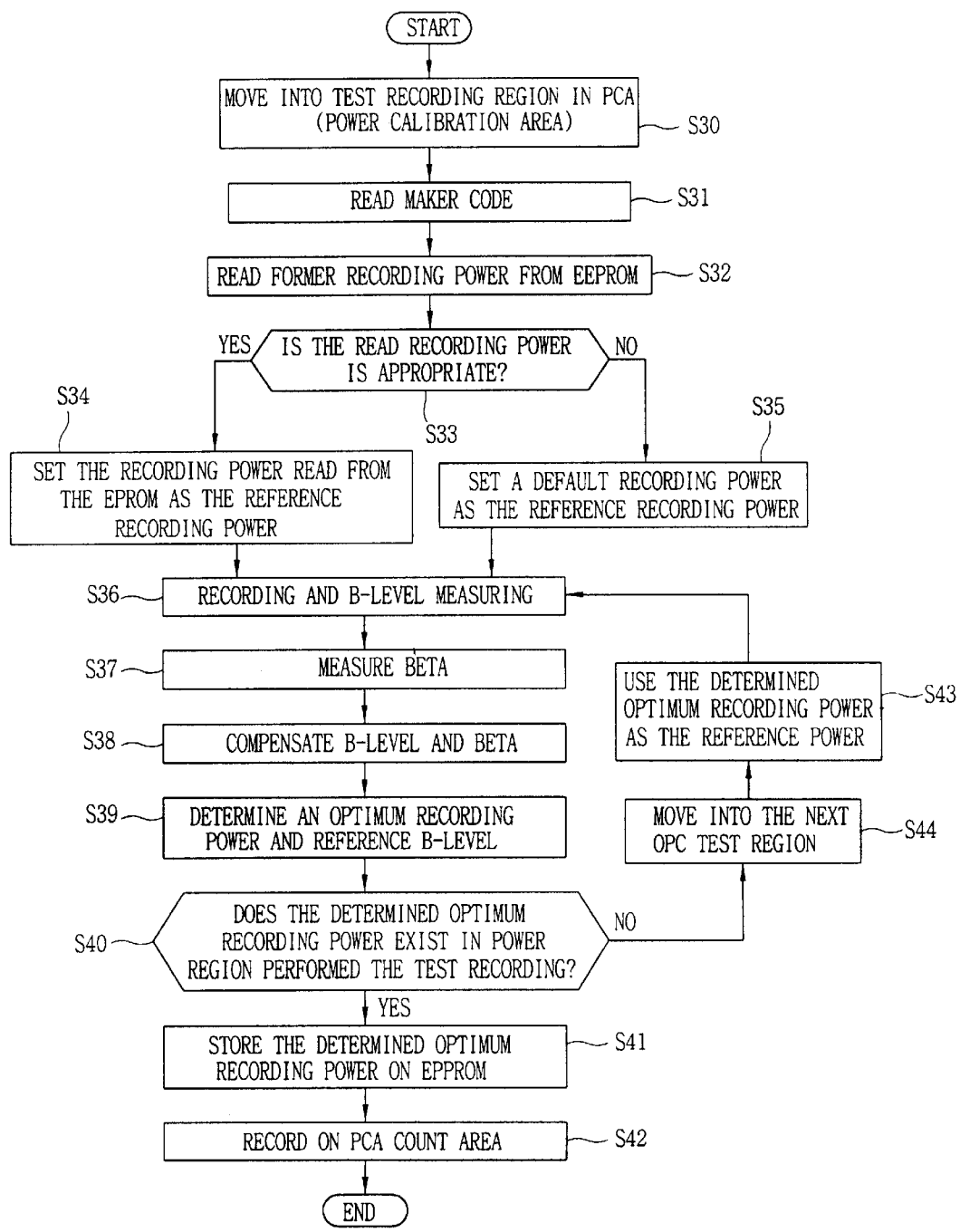
FIG. 3 is a flow chart illustrating a method for determining an optimum recording power of an optical disk in accordance with an embodiment of the present invention.

FIG. 3 is a flow chart illustrating a method for determining an optimum recording power of an optical disk in accordance with an embodiment of the present invention.

As depicted in FIG. 3, the present invention comprises a process for determining whether the former recording power stored on a memory in accordance with a maker code and recording times speed is appropriate to the reference recording power in step S33, a setting process for setting the stored recording power as the reference recording power when the stored recording power is appropriate in step S34 or setting default recording power as the reference recording power when the stored recording power is not appropriate in step S35, a measuring and compensating process for measuring and compensating a B-level and a beta value by test-recording on the disk with the reference recording power in step S38, a judging process for judging whether the determined optimum recording power exists in the recording power region performed the test recording after determining the optimum recording power and reference B-level from the compensated beta value and B-level in step S40, a repetition-performing process for performing repeatedly the B-level and beta value compensation operation by setting the determined optimum recording power as the reference recording power by moving into the next OPC test region when the determined optimum recording power does not exist in the recording power region performed the test recording in step S43, and a recording process for storing the determined optimum recording power on a memory and recording on a PCA counter region with the determined optimum recording power when the determined optimum recording power exists in the recording power region performed the test recording in step S42.

Its explanation will now be described in detail with reference to accompanying FIGS. 4–10.

First, the maker code is read from the ATIP (Absolute Time In Pre-groove) information of the optical disk in step S31, and the recording power as the former OPC result stored on a nonvolatile memory is read in step S32.

It is judged whether the read maker code and the former recording power read in accordance with the speed for recording data on the optical disk are appropriate to the reference recording power in step S33.

Herein, when the former recording power read from the nonvolatile memory is appropriate, the read former recording power is set as the reference recording power, and the test recording is performed in step S34.

On the contrary, when the read former recording power is not appropriate, the default power set in advance in accordance with times speed of the optical disk is set as the reference recording power, and the test recording is performed at step S35.

Herein, a memory such as an EEPROM (Electrically Erasable and Programmable Read Only Memory) which is capable of saving data when power is not applied to the optical recording reproducing apparatus is used as the nonvolatile memory.

After that, the test recording region in the optical disk is set as a power scan region for searching the optimum recording power by varying the recording power centering around the set reference recording power and a compensation region for compensating for the rotating elements of the optical disk with the same reference recording power.

The power scan region and compensation region perform the operation for measuring the B-level while recording the data on the optical disk with the pertinent recording power in step S36.

Figure 4:
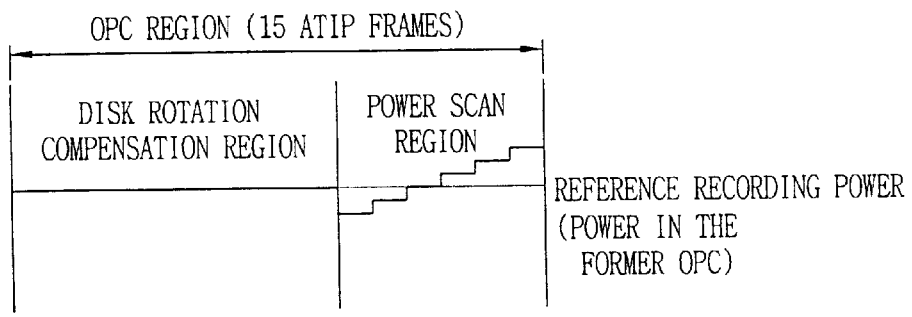
FIG. 4 illustrates variations in the recording power of each ATIP (Absolute Time In Pre-groove) of FIG. 3.

As depicted in FIG. 4, the compensation region for compensating for the rotating elements of the optical disk is constructed with one rotation of the optical disk.

FIG. 4 illustrates the variation of the recording power of each ATIP of FIG. 3.

Meanwhile, when the power scan region is set as the rest region subtracting the compensation region from the whole OPC region, because the PCA test region is placed on the most inside circumference of the optical disk, the compensation region for compensating for the rotating elements of the optical disk is constructed about 9ATIP.

In addition, the B-level is measured while recording data on the compensation region with the reference recording power, and the B-level is measured while recording data on the power scan region with the different level recording power in step S36.

Figure 5:
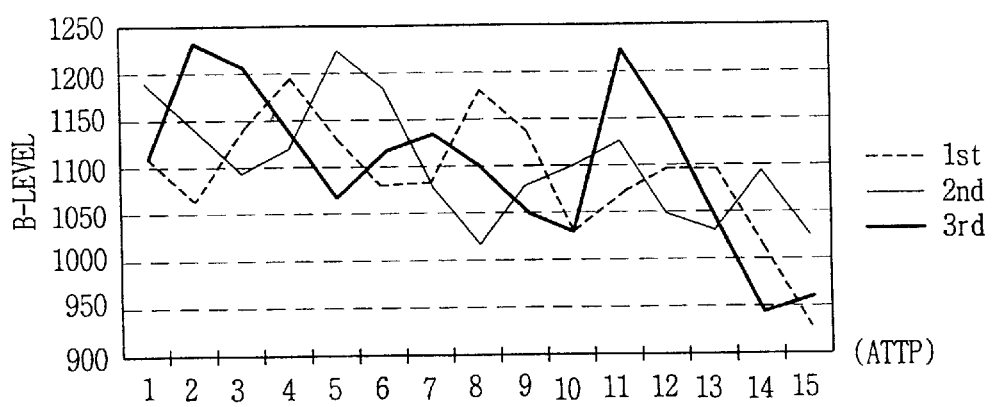
FIG. 5 illustrates a B-level of FIG. 3 digitized in accordance with time.

FIG. 5 illustrates the B-level of FIG. 3 digitized in accordance with time.

When the test recording operation on the test recording region is finished, the beta value is measured while reproducing the test recording region S37.

Figure 6:
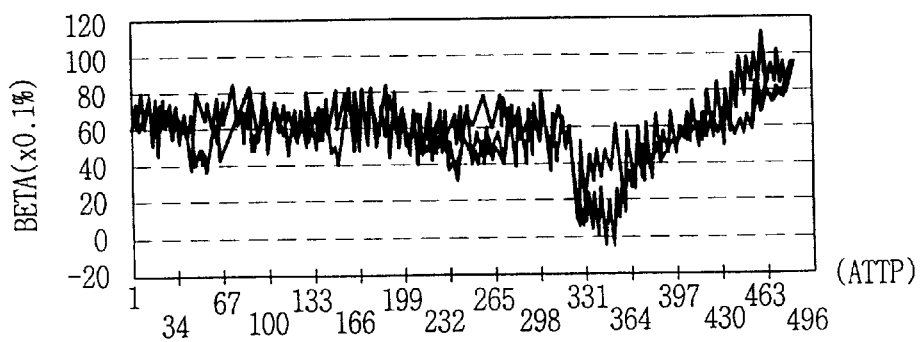
FIG. 6 illustrates a beta signal of FIG. 3 in accordance with detect time through a microscope.

FIG. 6 illustrates a beta signal of FIG. 3 in accordance with detect time through a microscope.

Figure 7:
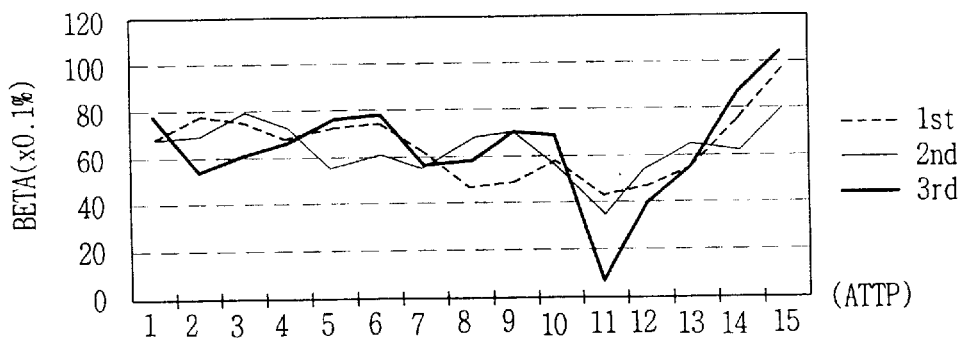
FIG. 7 illustrates a digitized beta signal of FIG. 5.

The measured beta value is digitized as shown in FIG. 7 illustrates a digitized beta signal of FIG. 5.

The operation for compensating for the rotating elements of the optical disk about the measured beta value is performed on the power scan region, and the beta value and B-level are compensated for by adding a beta average value for one rotation of the optical disk to the beta value difference of the one rotation element compensation region corresponding to each position of the power scan region in step S38.

For example, when the beta value before the compensation k-th ATIP (Absolute Time In Pre-groove) region is B[k], an ATIP of 1~N is the rotation element compensation region, and N+1~15 ATIP is the power scan region (herein the constant k is 1~15), the beta average for compensating for the rotation elements of the optical disk is $$\frac{(B[1] + B[2] + 0 + B[N]}{N}.$$

In addition, the beta value of the k-th ATIP detecting region after the compensation is the beta average −B[k-9] of B[k]+rotation element compensation region.

Accordingly, the recording power of the region coincided with target beta among beta values of the compensated power scan region is set as the optimum recording power, B-level at this time is set as the reference B-level for being used at the running OPC in the real recording in step S39.

Figure 8:
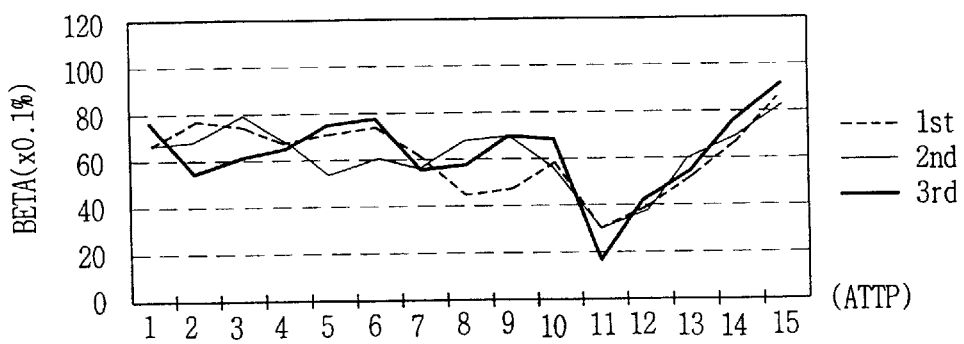
FIG. 8 illustrates a digitized beta signal of FIG. 3 compensated in accordance with time.
Figure 9:
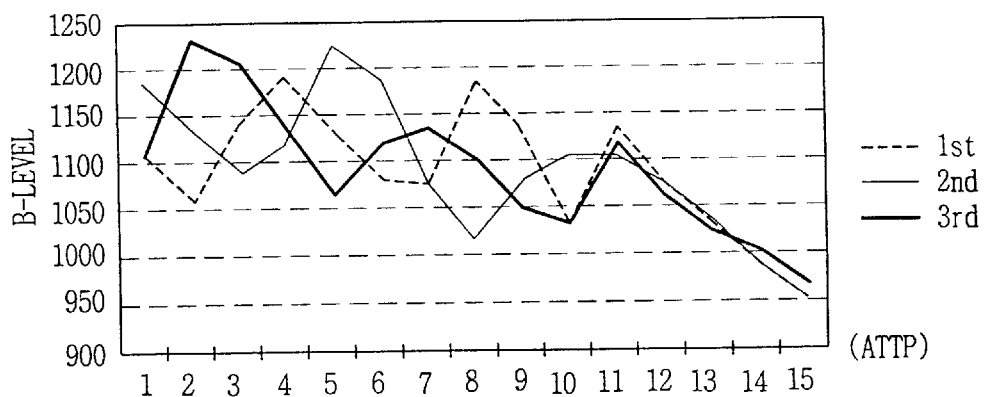
FIG. 9 illustrates a digitized B-level of FIG. 3 compensated in accordance with time.

Herein, the compensated beta value and set reference B-level described with respect to FIGS. 8 and 9. In other words, FIG. 8 illustrates the digitized beta signal of FIG. 3 compensated for in accordance with time. FIG. 9 illustrates the digitized B-level of FIG. 3 compensated for in accordance with time.

After that, when the test recording is performed on the rotating elements compensation region of the optical disk after recording data on the power scan region with the different level recording power, the beta value of the k-th ATIP (Absolute Time In Pre-groove) region after the compensation is the beta average −B[k+9] of the B[k]+rotating element compensation region.

Figure 10:
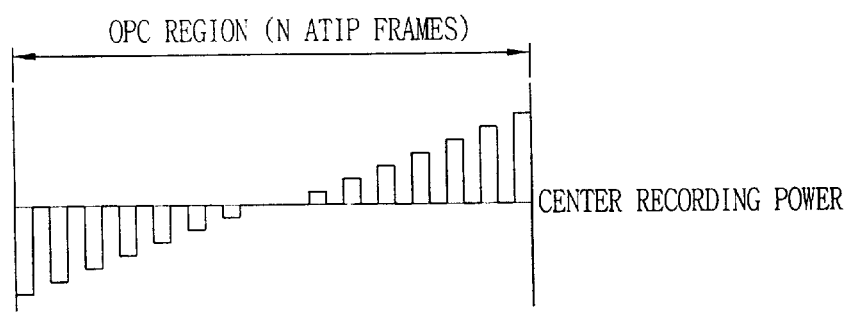
FIG. 10 illustrates variations in the recording power of each ATIP (Absolute Time In Pre-groove) of FIG. 3 in accordance with the other embodiment of the present invention.

The test recording region recording and B-level measuring operation in accordance with another embodiment of the present invention are described in FIG. 10, which illustrates variations in the recording power of each ATIP of FIG. 3.

As depicted in FIG. 10, the recording and B-level measurements are performed by dividing each ATIP (Absolute Time In Pre-groove) in the test recording region into the compensation region for compensating for the rotating elements of the optical disk and power scan region, with one half of each ATIP (Absolute Time In Pre-groove) being recorded as the reference recording power for compensating for the rotating elements of the disk.

In order to search the optimum recording power, the other half is test-recorded with the different level recording power centering around the reference recording power.

The beta value and B-level are compensated for by measuring each B-level.

For example, when the beta level B[k] before compensating for the rotating elements of the k-th ATIP (Absolute Time In Pre-groove) region is assumed to be the beta level A[k] after the compensation (herein, 0<(k≦N), the beta average value of the region for compensating for the rotating elements of the optical disk is $$\frac{(B[1] + B[2] + 0 + B[N]}{N}.$$

In addition, the beta value A[K] of the compensated k-th ATIP region is the beta average value of the B[k] +rotating element compensation region. In other words, the optimum recording power is determined from the compensated beta value.

Herein, the computation of the B-level is the same as a computation method for calculating the beta average value.

After that, it is judged whether the optimum recording power determined from the compensated beta value exists in the recording region where the test recording is performed, in step S40.

When the determined optimum recording power does not exist in the recording power region where the test recording is performed, it is moved into the next test recording region in step S44, the determined optimum recording power is set as the reference recording power, and the B-level measuring operation is performed again while recording data on the optical disk in step S43.

Meanwhile, when the determined optimum recording power exists in the recording power region where the test recording is performed, in order to perform the next OPC, the determined optimum recording power is stored on an address of the volatile memory corresponding to the maker code of the optical disk and data recording speed on the optical disk in step S41.

After that, it is recorded on the PCA counter region with the determined optimum recording power so that the region where the OPC is performed is used by the determined optimum recording power and reference B-level in step S42.

As described above, the present invention responds to the influence of the rotating elements of the optical disk by compensating for the varied value of the beta value and B-level in accordance with the rotating elements of the optical disk.

In addition, the present invention can record data on the optical disk accurately by determining the optimum recording power reflecting effect in accordance with the rotating elements of the optical disk.

The present invention is also capable of improving the recording quality of the optical disk by recording data on the optical disk at the determined optimum recording power that reflects the effect in accordance with the rotating elements of the optical disk.

Moreover, the present invention can minimize errors between the optimum recording power and reference recording power caused by nuances among disks due, for example to different writing methods and manufacturer specifications.

Additionally, the present invention can improve resolution of the recording power for recording in the OPC operation by storing the former OPC result by the maker code and recording speed of the optical disk and using the recording power stored during the OPC operation as the reference recording power.

Finally, the present invention can find the optimum recording power by heightening the resolution of the recording power for recording during the OPC operation.

What is claimed is:

1. A method for determining an optimum recording power of an optical disk having a test recording region provided thereon in order to set the optimum recording power, comprising the steps of:
   test-recording on one portion of the test-recording region while varying a recording power from a reference recording power;
   test-recording on another test recording region using the reference recording power; and
   determining the optimum recording power from each test recording.

2. The method for determining the optimum recording power of an optical disk according to claim 1, wherein the step of test-recording with the reference recording power further includes compensating for variation between a beta value and a B-level value due to rotation of the optical disk.

3. The method for determining the optimum recording power of an optical disk according to claim 1, wherein the step of test-recording with the reference recording power and the step of test-recording while varying the reference recording power are performed by turns at each ATIP of the test recording region.

4. The method for determining the optimum recording power of an optical disk according to claim 1, wherein the step of test-recording with the reference recording power and the step of test-recording while varying the reference recording power are separately and consecutively performed in the test recording region.

5. A method for determining an optimum recording power of an optical disk, comprising:
   determining whether a former recording power stored in a memory in accordance with a maker code and recording speed is appropriate as a reference recording power;
   setting the stored recording power as the reference recording power when the stored recording power is appropriate or setting a default recording power as the reference recording power when the stored recording power is not appropriate;
   measuring and compensating a B-level and a beta value by test-recording on the disk with the reference recording power;
   determining whether a test recording performed at a determined optimum recording power exists in a recording power test region where the test recording was performed after determining the optimum recording power and reference B-level from the compensated beta value and B-level;
   performing repeatedly the B-level and beta value compensation operation by setting the determined optimum recording power as the reference recording power by moving into a next OPC test region when a test recording at the determined optimum recording power does not exist in the recording power test region where the test recording was performed; and
   storing the determined optimum recording power in a memory and recording on a PCA counter region with the determined optimum recording power when a test recording at the determined optimum recording power exists in the recording power test region where the test recording was performed.

6. The method for determining the optimum recording power of the optical disk according to claim 5, wherein the test recording comprises:
   a test-recording step for test-recording the rest region among a certain region for the test-recording with same reference recording power; and
   a test-recording step for test-recording on a certain region for the test-recording with a recording power of the different level each other at each ATIP centering around the reference recording power.

7. The method for determining the optimum recording power of an optical disk according to claim 5, wherein the step of determining whether a test recording performed at the determined optimum recording power exists comprises test-recording on more than 9 ATIP frames over one rotation on the most inside circumference of the disk in order to compensate for variation between a beta value and a B-level value due to rotation of the optical disk.

8. The method for determining the optimum recording power of the optical disk according to claim 5, wherein the test recording comprises:
   a test-recording step for test-recording on a certain region for the test-recording with recording power of the different level each other at each ATIP centering around the reference recording power; and a test-recording step for test-recording the rest regions among a certain regions for the test-recording with same reference recording power.

9. The method for determining the optimum recording power of an optical disk according to claim 8, wherein the step of setting the reference recording power comprises test-recording on a region of more than 9ATIP frames over one rotation on the most inside circumference of the disk.

* * * * *